(12) United States Patent
Kirkland

(10) Patent No.: US 11,071,243 B2
(45) Date of Patent: Jul. 27, 2021

(54) UNIVERSAL PLANTING DRILL

(71) Applicant: K and K Farm Implements, LLC, Batesburg, SC (US)

(72) Inventor: Paige F. Kirkland, Wagener, SC (US)

( * ) Notice: Subject to any disclaimer, the term of this patent is extended or adjusted under 35 U.S.C. 154(b) by 219 days.

(21) Appl. No.: 16/207,315

(22) Filed: Dec. 3, 2018

(65) Prior Publication Data
US 2020/0170168 A1    Jun. 4, 2020

Related U.S. Application Data

(60) Provisional application No. 62/593,280, filed on Dec. 1, 2017.

(51) Int. Cl.
| | | |
|---|---|---|
| *A01B 49/06* | (2006.01) | |
| *A01C 7/20* | (2006.01) | |
| *A01C 5/06* | (2006.01) | |
| *A01B 49/02* | (2006.01) | |

(52) U.S. Cl.
CPC ............ *A01B 49/06* (2013.01); *A01B 49/027* (2013.01); *A01C 5/064* (2013.01); *A01C 7/208* (2013.01)

(58) Field of Classification Search
CPC ....... A01B 49/027; A01B 49/04; A01B 49/00; A01B 49/06; A01C 5/064; A01C 7/208; A01C 5/062; A01C 5/06; A01C 5/00; A01C 7/20; A01C 7/00; A01C 7/10
See application file for complete search history.

(56) References Cited

U.S. PATENT DOCUMENTS

| | | | |
|---|---|---|---|
| 2,528,986 A | * | 11/1950 | Adams ................... A01C 7/085 239/665 |
| 4,473,016 A | | 9/1984 | Gust |
| 4,615,286 A | | 10/1986 | Linton |
| 5,392,707 A | | 2/1995 | Romans |
| 5,413,055 A | | 5/1995 | Dern |
| 5,915,313 A | | 6/1999 | Bender et al. |
| 6,530,332 B2 | | 3/2003 | Burley |
| 6,598,548 B2 | | 7/2003 | Lempriere |
| 8,590,632 B2 | | 11/2013 | Berglund |
| 9,167,742 B2 | | 10/2015 | Masten |
| 9,474,201 B2 | | 10/2016 | Wilhelmi et al. |
| 9,596,802 B2 | | 3/2017 | Funck |
| 9,686,904 B2 | | 6/2017 | Roszman et al. |
| 2010/0010667 A1 | * | 1/2010 | Sauder ................... A01C 7/04 700/231 |

FOREIGN PATENT DOCUMENTS

| | | |
|---|---|---|
| DE | 3824061 | 1/1990 |
| EP | 0592995 | 6/1996 |
| EP | 0843957 | 8/2001 |

* cited by examiner

*Primary Examiner* — Christopher J. Novosad
(74) *Attorney, Agent, or Firm* — Burr & Forman LLP; Douglas L. Lineberry

(57) ABSTRACT

A removably affixable universal planting drill that can be fastened to existing soil conditioning equipment, thereby simultaneously conditioning the soil and planting seeds, without the need for replacing existing cultivation devices.

16 Claims, 12 Drawing Sheets

| SETTING | 1 | 2 | 3 | 4 | 5 | 6 | 7 | 8 | 9 | 10 | 11 | 12 |
|---|---|---|---|---|---|---|---|---|---|---|---|---|
| Wheat |  | 31 | 62 | 84 | 146 | 188 |  |  |  |  |  |  |
| Oats |  | 21 |  | 78 |  | 84 |  | 125 |  | 146 |  | 168 |
| Peas |  | 62 | 164 | 125 | 145 | 167 | 208 |  |  |  |  |  |
| Soybeans |  |  | 83 | 104 |  | 188 |  |  |  |  |  |  |
| Rye Grass |  | 42 |  | 84 |  | 125 |  | 167 |  |  |  |  |
| Proso Millet | 18 | 42 | 84 | 104 | 125 | 168 |  |  |  |  |  |  |
| Brown Top | 15 | 40 | 81 | 100 | 121 | 142 |  |  |  |  |  |  |
| Sunflower |  |  |  | 42 |  | 83 |  | 125 |  |  |  |  |
| MILO |  | 63 | 107 | 146 | 169 | 210 |  |  |  |  |  |  |

POUNDS / ACRE

All settings are calibrated at a travel speed of 5.5 mph

FIGURE 12

UNIVERSAL PLANTING DRILL

BACKGROUND OF THE INVENTION

1) Field of the Invention

The present invention relates to an improved planting drill that may be affixed to existing farm, or other implements, to assist with planting crops in a single pass rather than requiring multiple over passes or cross passes.

2) Description of Related Art

In agriculture, a harrow, often called a set of harrows, is an implement for breaking up and smoothing out the surface of the soil. In this way, it is distinct in its effect from the plough, which is used for deeper tillage. Harrowing is often carried out on fields to follow the rough finish left by plowing operations. The purpose of harrowing is generally to break up clods (lumps of soil) and to provide a finer finish, a good tilth or soil structure that is suitable for seedbed use. Coarser harrowing may also be used to remove weeds and to cover seed after sowing. Harrows differ from cultivators in that they disturb the whole surface of the soil, such as to prepare a seedbed, instead of disturbing only narrow trails that skirt crop rows (to kill weeds).

There are four general types of harrows: disc harrows, tine harrows (including spring-tooth harrows, drag harrows, and spike harrows), chain harrows, and chain-disk harrows. Harrows were originally drawn by draft animals, such as horses, mules, or oxen, or in some times and places by manual laborers. In modern practice they are almost always tractor-mounted implements, either trailed after the tractor by a drawbar or mounted on the three-point hitch. A modern development of the traditional harrow is the rotary power harrow, often just called a power harrow.

In cooler climates, the most common types are the disc harrow, the chain harrow, the tine harrow or spike harrow and the spring tine harrow. Chain harrows are often used for lighter work such as levelling the tilth or covering seed, while disc harrows are typically used for heavy work, such as following ploughing to break up the sod. In addition, there are various types of power harrows, in which the cultivators are power-driven from the tractor rather than depending on its forward motion.

Tine harrows are used to refine seed-bed conditions before planting, to remove small weeds in growing crops, and to loosen the inter-row soils to allow for water to soak into the subsoil. The fourth type is a chain disk harrow. Disks attached to chains are pulled at an angle over the ground. These harrows move rapidly across the surface. The chains and disks rotate to stay clean while breaking up the top surface to about 1 inch (3 cm) deep. A smooth seedbed is prepared for planting with one pass.

Chain harrowing can be used on pasture land to spread out dung, and to break up dead material (thatch) in the sward, and similarly in sports-ground maintenance. A light chain harrowing is often used to level off the ground after heavy use to remove and smooth out boot marks and indentations. Used on tilled land in combination with the other two types, chain harrowing rolls remaining larger soil clumps to the surface where weather breaks them down and prevents interference with seed germination.

All four harrow types can be used in one pass to prepare soil for seeding. It is also common to use any combination of two harrows for a variety of tilling processes. Where harrowing provides a very fine tilth, or the soil is very light so that it might easily be wind-blown, a roller is often added as the last of the set.

Harrows may be of several types and weights, depending on their purpose. They almost always consist of a rigid frame that holds discs, teeth, linked chains, or other means of moving soil, but tine and chain harrows are often only supported by a rigid towing-bar at the front of the set.

In the southern hemisphere, so-called giant discs are a specialized kind of disc harrows that can stand in for a plough in rough country where a moldboard plough cannot handle tree-stumps and rocks, and a disc-plough is too slow (because of its limited number of discs). Giant scalloped-edged discs operate in a set, or frame, that is often weighted with concrete or steel blocks to improve penetration of the cutting edges. This sort of cultivation is usually followed by broadcast fertilization and seeding, rather than drilled or row seeding.

The preferred method of planting and sowing fertilizers is to broadcast seed then disc harrow lightly to cover the seed. While this method is effective, it requires at least two passes and seeds usually are broadcast out of the target area. Further, traditional grain drills are ground driven and specific to planting only, and again usually require at least two passes.

Various attempts have been made to improve seeding. For instance, U.S. Pat. No. 5,413,055 (Dern '055) discloses a seeder designed to seed all types of terrain including remote disrupted areas such as pipelines, oil wells, and the like. The seeder has a seeder box that is designed to be carried on the front of a vehicle and soil firming wheels on a drawbar that is pulled behind the vehicle. The seeder box has flexible discharge tubes that prevent influence from the wind on the seed being discharged and that are flexible and provide random, non-symmetrical planting. The seeder box can include more than one section, with each section having a hinged support providing positioning in horizontal or inclined planes. The press rings are associated with a mounting frame on the drawbar that allows each ring to adjust vertically according to the contour of the seeded ground. The drawbar supports a harrow ahead of the soil firming rings and also may support an auxiliary seeder. (Abstract.) However, this device requires a following trailer and rings as well as an integrated seed box.

U.S. Pat. No. 8,590,632 (Berglund '632) provides a single pass ground driven tiller and seeder apparatus that includes a support frame, an elongated drive rotor journaled transversely on the frame, a tillage assembly pivotally connected to the frame and formed by a pair of rearwardly extending bearing plates and having an elongated tillage rotor journaled thereto and extending transversely there between, and a firming roller journaled between mounting plates pivotally connected to the bearing plates. See FIG. 1. The drive rotor is rotated by ground contact as the apparatus is drawn along by a tractor. The drive rotor is drivingly engaged with the tillage rotor so that the tillage rotor rotates at a faster speed than the drive rotor. A seed metering mechanism is supported on the frame and deposits seed in front of the drive rotor. The tillage rotor breaks the soil and incorporates the seed into the soil, after which the firming roller firms the seed bed. (Abstract.) However, this is a self-contained device that cannot be used to enable a currently existing harrow to provide a one-pass seed/soil condition. Instead, one would have to purchase this device.

U.S. Pat. No. 6,530,332 (Burley '332) discloses an earth working apparatus. See FIG. 2. The apparatus generally includes a frame, a harrow cultivator connected to the frame and adapted to be angled and adjusted for height with respect to the frame, a plow cultivator connected to the frame and adapted to be adjusted for height, a seed and fertilizer dispensing hopper connected to the frame, a drag and compactor device connected to the frame, a height adjustment for setting the soil depth of the harrow cultivator and plow cultivator and an adjustable one-point hitch attachment. The apparatus is adapted to be attached to a wide variety of prime movers. (Abstract.) However, this device is extremely complicated and stand-alone. Unlike the current disclosure, it cannot be used to modify an existing harrow, but, instead, would replace the entire device.

What is needed in the art is a device that can be used with an existing harrow to allow single pass soil conditioning and seeding. Accordingly, it is an object of the present disclosure to provide an improved universal planting drill that can condition a soil bed and plant seeds in one pass using a farmer's existing equipment. The current disclosure device is fastened to existing equipment, the same equipment that is conditioning the seed bed, thereby simultaneously conditioning the soil and planting seeds, without the need for replacing existing cultivation devices or buying entirely new devices.

SUMMARY OF THE INVENTION

The present disclosure provides in one embodiment, a universal planting drill. The drill includes at least one implement bracket that is affixed to a host implement, such as a harrow, plow, loading deck, etc., at least one horizontal mounting bar, a seed box; and at least one seed box mounting bracket. Further, the planting drill includes a wiring harness. Still further, the at least one implement bracket is configured to slidably engage the host implement frame. Still yet further, the at least one implement bracket is configured to slidably engage the at least on horizontal mounting bar and can be variably positioned along a length of the at least one horizontal mounting bar. Furthermore, the at least on mounting bracket has at least two openings positioned at an angle to one another wherein each of the at least two openings is configured to engage the at least one horizontal mounting bar. Further still, the universal planting drill is not ground driven. Even further, the seed box comprises a seed dispenser and a drive shaft. Still yet further, the universal planting drill includes a seed direction motivator. Even further, the universal planting drill includes a motor.

In an alternative embodiment, a method of adding a universal planting drill to an existing implement comprising is provided. The method includes attaching at least one implement bracket to an existing implement frame, affixing at least one horizontal mounting bar to the at least one implement bracket; and attaching a seed box to the at least one horizontal bracket via at least one seed box mounting bracket, wherein the universal planting drill is affixed to an existing implement. Still further the method includes connecting the universal planting drill a power source. Further yet, the method comprises configuring the at least one implement bracket to slidably engage a host implement frame. Still yet further, the method includes configuring the at least one implement bracket to slidably engage the at least on horizontal mounting bar and can be variably positioned along a length of the at least one horizontal mounting bar. Even further, the method includes configuring the at least on mounting bracket to have at least two openings positioned at an angle to one another wherein each of the at least two openings is configured to engage the at least one horizontal mounting bar. Further yet, the universal planting drill is configured so that it is not driven or caused to deploy seeds via contact with the ground. Even yet, the method includes configuring the seed box to include a seed dispenser and a drive shaft. Yet still, the method includes attaching a seed direction motivator to the universal planting drill. Even further, the method includes attaching a motor to the universal planting drill.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 12 shows a planting guide for a universal planting drill of the current disclosure.

Figure 1:
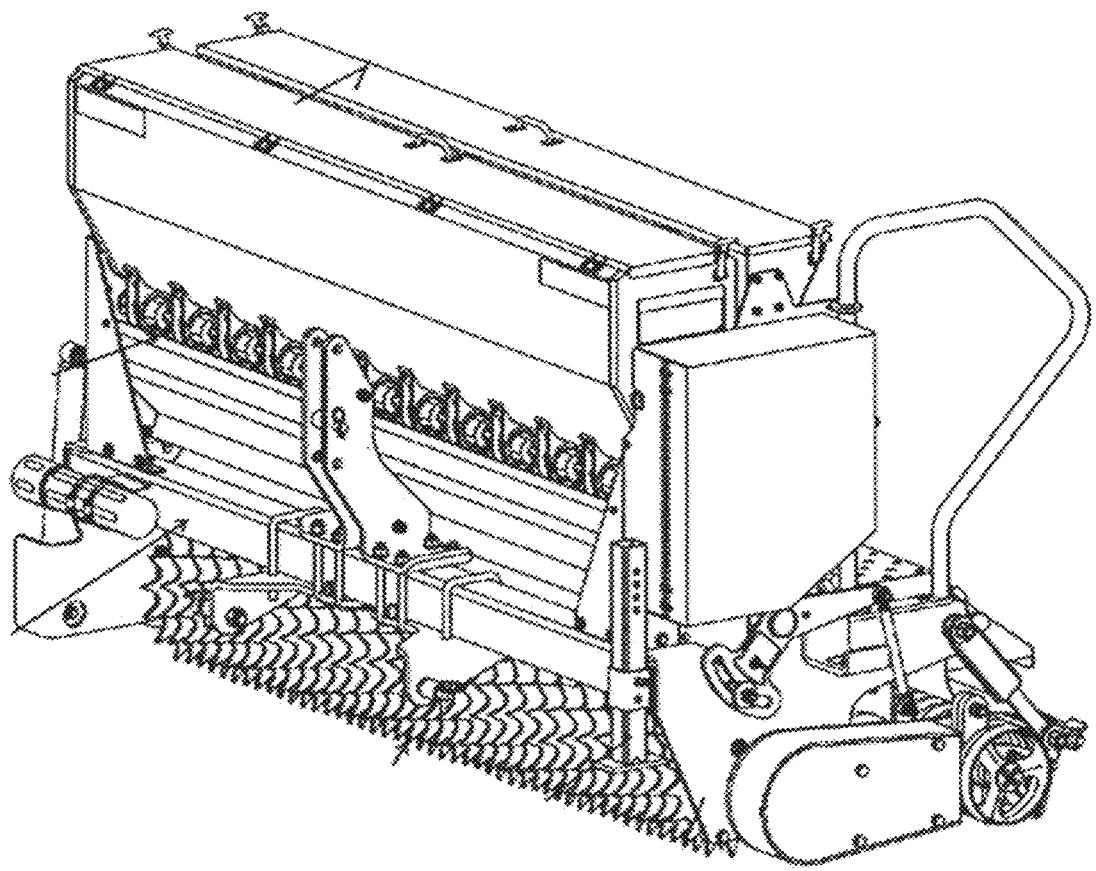
FIG. 1 shows a prior art driven tiller.
Figure 2:
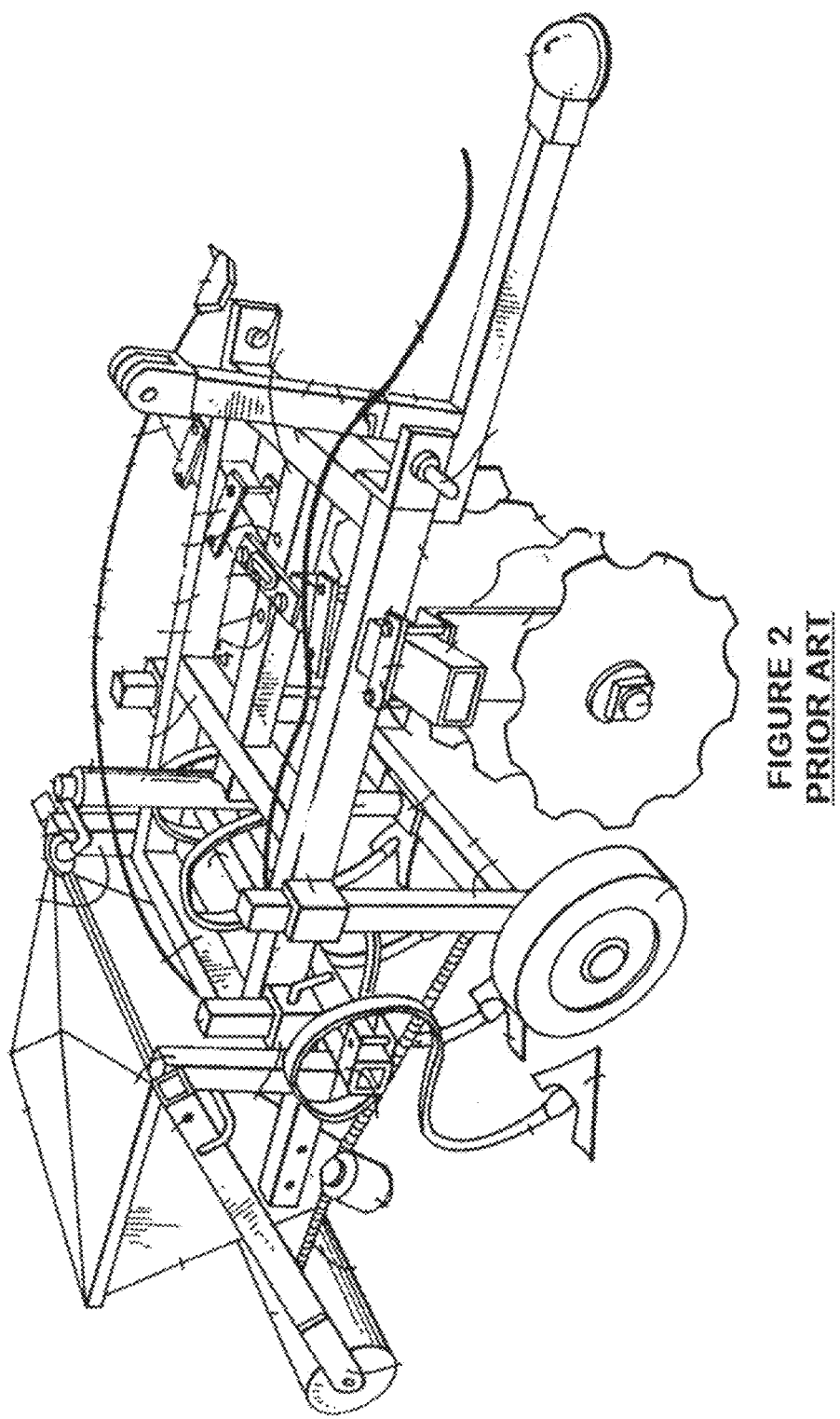
FIG. 2 shows another prior art device.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Figure 3:
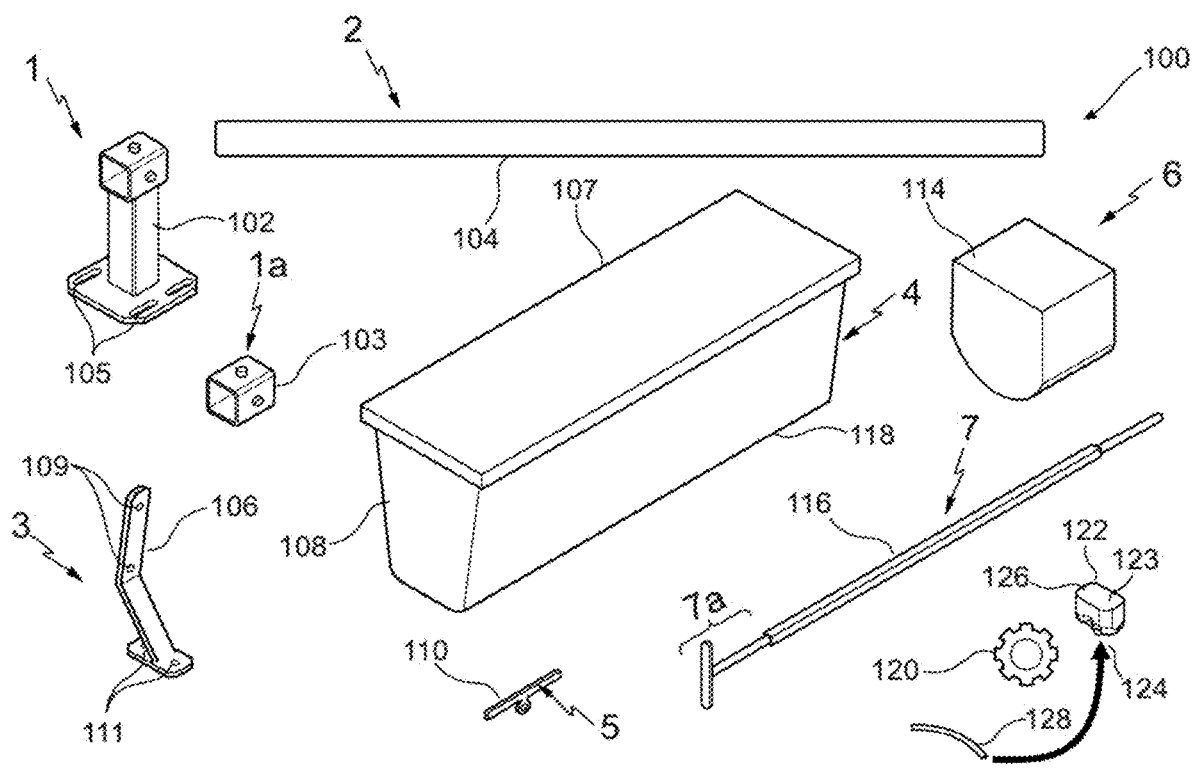
FIG. 3 shows an exploded view of one embodiment of a universal planting drill of the current disclosure.

The current disclosure is directed to a removably affixable universal planting drill that can be fastened to existing soil conditioning equipment, thereby simultaneously conditioning the soil and planting seeds, without the need for replacing existing cultivation devices. FIG. 3 shows an exploded view of a universal planting drill 100 of the current disclosure. Universal planting drill may be made from metals, plastics, synthetics, etc., as known to those of skill in the art. In one embodiment, the seed container is made from aluminum, the seed dispensing cup/gear is made from plastic, and all other brackets, handles, etc., are fabricated from metal. Drill 100 may include at least one drill mounting bracket 102. Drill mounting bracket 102 may be secured to a harrow or other soil conditioning device via securing drill mounting bracket 102 with u-bolts, or other securement means, through openings 105, to mount drill 100 on an existing farm implement such as a harrow via affixing to a frame, not shown, of the existing farm implement. Further with adapters, the mounting gear may be attached to both tube frame implements as well as angle iron implements. Further, widths of the host implement will make little difference on mounting capability, with a minimum length of eighteen inches preferred, however, few implements will fall below this range. Drill mounting bracket 102 works in conjunction with horizontal mounting bar receiver 103. Drill mounting bracket 102 along with horizontal mounting bar receiver 103 serve to secure horizontal mounting bar 104, which supports seed box mounting bracket 106. While shown separately, drill mounting bracket 102 and horizontal mounting bar receiver 103 may be integral with one another in some embodiments to provide additional support for horizontal mounting bar 104. In other embodiments, drill mounting bracket 102 and mounting bar receiver 103 may be secured to one another via bolts or other means as known to those of skill in the art. Further, drill mounting bracket 102 and mounting bar receiver 103 may work together to allow drill 100 to accommodate different size soil conditioning devices by forming drill mounting bracket with at least two, or more, mounting bar receivers set at angles to one another, such as from 10, 20, 30, 40, 45, 50, 60, 70, 80, 90, up to 180 degrees with respect to one another. Then by rotating mounting bracket 102, engagement with a different mounting bar receiver is accomplished and the different mounting bar receiver will engage mounting bar 104 instead of mounting bracket 102. Seed box mounting bracket 106, attaches to and secures seed box 108, and may be secured to horizontal mounting bar 104 via bolts or other means threaded through mounting bracket openings 111. Attachment may be accomplished via bolts, screws, adhesives, etc., in one embodiment, bolts, not shown, may be ran through mounting bracket openings 109 and into the interior of seed box 108. Adjusting knob support 110 supports seed flow adjustment knob 112, which controls the amount and rate of seed dispensed from seed box 108. Drive motor 114, which may be a direct current (DC) motor, because the motors will need to correspond with tractors/ATVs, a preferred motor will be a 12 volt 6 amp 90 degree gear driven motor, and have a rpm of 50 in order to maintain more accurate seed calibration. The motor output shaft will be round, approximately $3/8$" with 6 amp nominal current. In one instance, a MAKERMOTOR brand motor may be used. In one embodiment, the motor may be secured to a triangular in shape metal plate with (3) small bolts. A hole in the upper center is bored for the motor shaft to pass thru, and (2) more $7/8$" holes are bored on the sides of the triangular plate to allow the chassis rails to pass thru to provide stability for the motor weight, yet still allowing both horizontal and vertical movement of the motor/plate combo. This would be necessary to allow the motor to move with the drive shaft as it is adjusted and for any misalignment from the motor to the drive shaft provides impetus for drive shaft 116, which is located below seed box 108 and extends along, at least, substantially the entirety of seed box 108 adjacent bottom 118 of seed box 108. Drive shaft 116, via impetus from drive motor 114, propels seeds from within the interior of seed box 108 by having the seeds encounter gear 120, which directs seeds into seed dispensing cup 122. Multiple gears 120 may be spaced along the length of drive shaft 116, the number of gears 120 being depending on the length of drive shaft 116. Dispensing cup 122 is generally a funnel in nature and has a top opening 126 and bottom opening 124 through which seeds pass as they exit seed box 108. The size of opening 124 may be controlled by a screw type device and handle fastened to the drive shaft using oversized nuts and roll pins. A female part of this device may be stationary, held in place by a triangular in shape plate that is bored with (2) $7/8$" holes on each side to allow the chassis rails to pass there through. A third $7/8$" hole may be bored into the upper center of this plate to house the female nut. The male counterpart may push or pull the drive shaft as it is tightened or loosened thru the female. The entire adjusting apparatus may be further secured by three (3) $1/4$" bolts traveling thru both the plate and the grain box. This mechanism may move the shaft approximately 2" by moving the drive shaft horizontally this will increase or decrease the amount of exposed gear within the seed cup, thus allowing more or less seed to be caught and pushed into the seed cup and be gravity fed to the soil, via a small optional tube, or free fall. Further, all holes that are bored concerning the box may be 5/16" and may use 1/4" bolts varying in length depending on the application. All holes for the mounting brackets may be bored at 5/8" and may use 1/2" depending on application. This drill is unique and beneficial because of its ability to be removed and not hinder its host implement from its original duty.

In use, universal planting drill 100 can plant/drill with one pass because it is fastened the same equipment that is creating and conditioning the seed bed, essentially the device of the current disclosure allows a user to do two things at the same time: prepare a seed bed and plant seeds. Seed box 108, as well as the entire universal planting drill 100, may come in varying sizes and dimensions to allow the device to work with different size implements to which drill 100 is mounted. Further, universal planting drill 100 may be mounted on tractor driven equipment, as well as ATV pulled implements. Importantly, universal planting drill 100 is operated with drive motor 114 and is not ground driven as found in the prior art. This alleviates several issues with prior art devices such as soil quality or terrain impacting seed delivery and seed feeding mechanisms becoming jammed or not functioning due to poor traction or soil impeding the harrow or other device. Further, powered seed delivery provides a more uniform seed coverage as seeds are dispensed as desired by adjusting seed flow adjustment knob 112, which controls the amount of seed flowing from seed dispensing cup 122 by controlling the size of opening 124 from which seeds are dispensed. Further, seed planting may be stopped simply by deactivating drive motor 114, while continuing to harrow the field or bed being prepared.

In one embodiment, seed box 108 may be formed from aluminum and seed dispensing cup 122 has gear 120 running thru interior 123 of seed dispensing cup 122. Gear 120 may be fastened to drive shaft 116, which in one embodiment may be a square rod that is turned slowly, such as for purposes of example only and not intended to be limiting 50 rpm with via impetus supplied via drive motor 114. In one embodiment, the motor speed may be 50 rpm on every unit. calibration may be accomplished with the motor at 50 rpm and the tractor/ATV speed at approximately 6 mph. Here, the only variable would be the amount of seed allowed to pass through, which would be determined by the seed adjuster. seed output may be measured at every (2) turns of the seed adjuster, corresponding with a marked number on the seed gauge, thus allowing the operator to determine the pounds/acre/square feet that the drill should apply. Forcing the seed out of seed box 108 and into seed dispensing cup 122 by the motion of gear 120 "pushing" seeds into seed dispending cup 122. In a further embodiment, bottom opening 124 of seed dispensing cup 122 may allow seeds to fall into a seed direction motivator 128, which in one embodiment may be a plastic or rubber tube that directs seed into a desired area that the attached implement will cover. Metering of seed delivery may be accomplished by controlling the amount of opening allowed for seed to fall thru and can be calibrated based on tractor speed, seed type/size, as well as the amount of opening allowed from the seed box into the cup. In use, a disc harrow will create an opening in the ground as well as cover the seed. Planting can be started or stopped by breaking the DC circuit with a simple "on/off" switch. The current disclosure also differs from prior devices in that it can be universally attached to varying sizes of equipment, such as disc harrows, without requiring a specialized separate piece of equipment specific to planting only.

Figure 4:
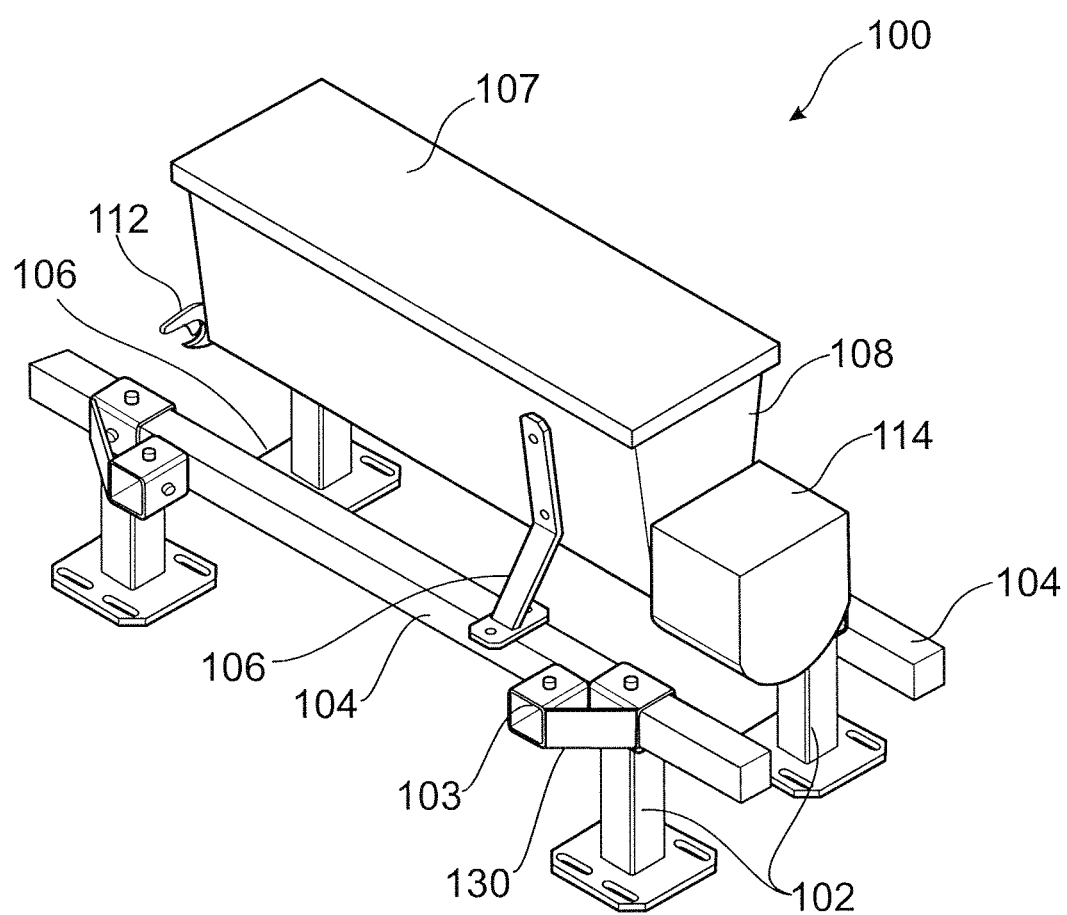
FIG. 4 shows a top down perspective view of one embodiment of a universal planting drill of the current disclosure.
Figure 5:
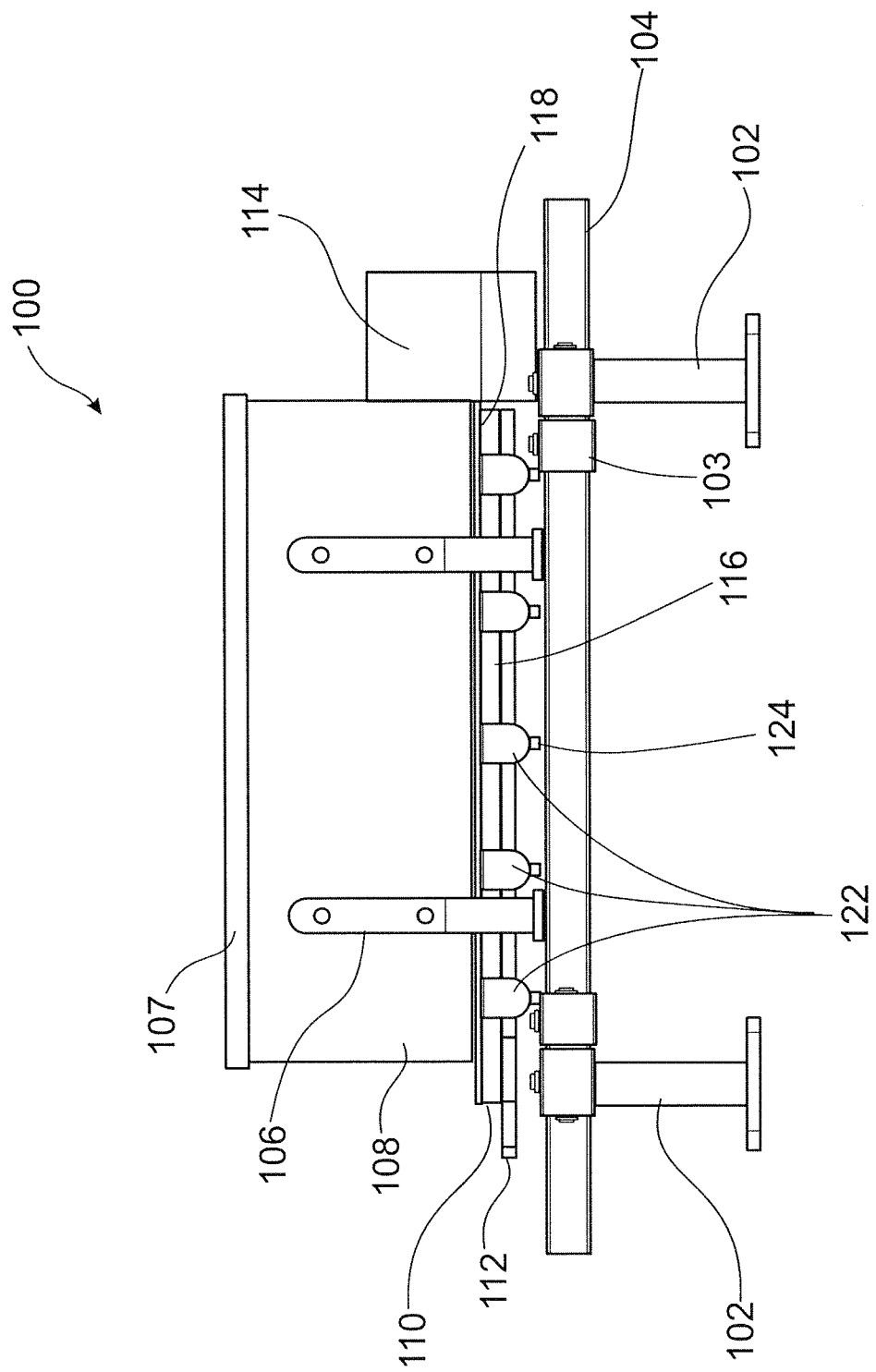
FIG. 5 shows a side view of one embodiment of a universal planting drill of the current disclosure.
Figure 6:
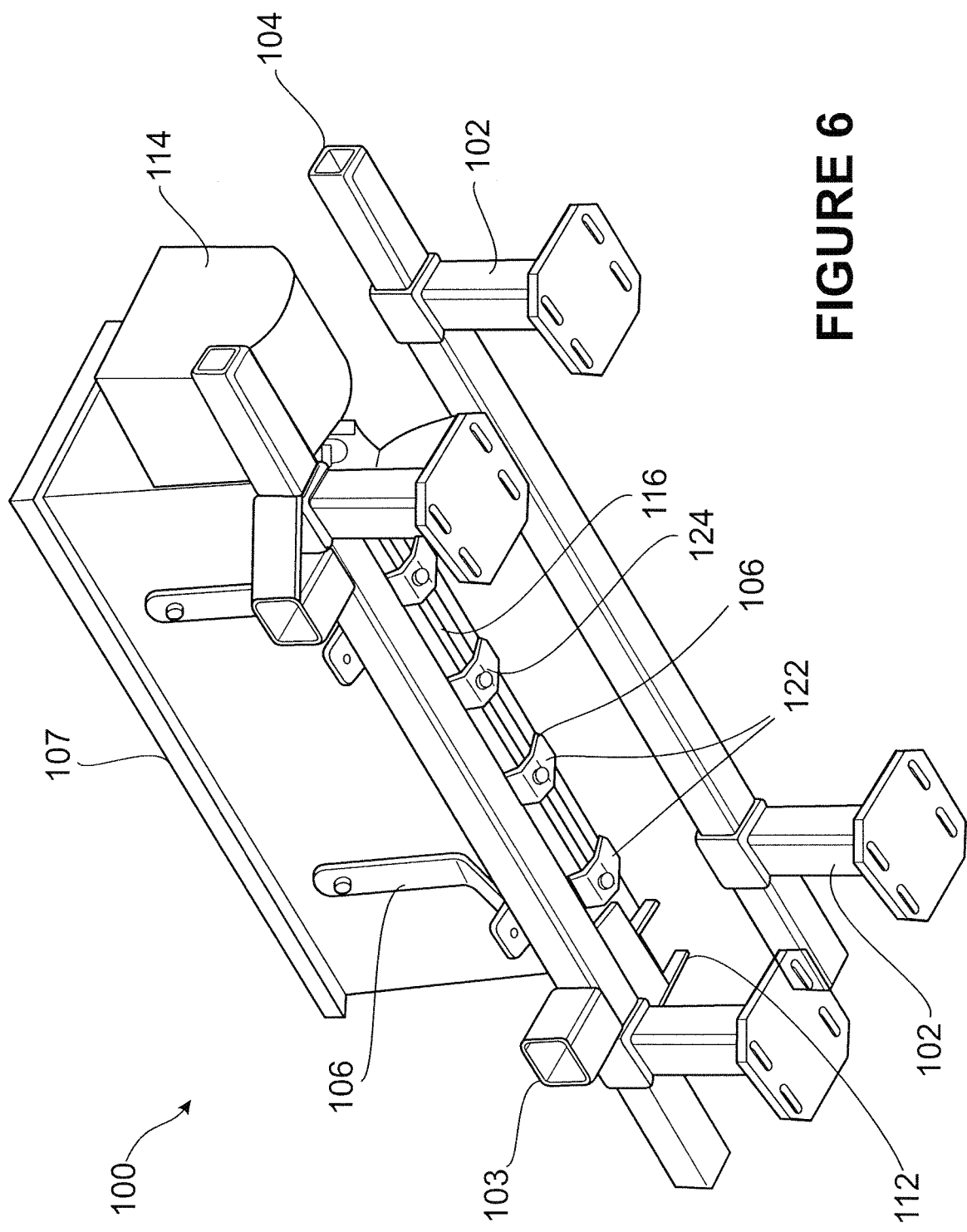
FIG. 6 shows a bottom up perspective view of one embodiment of a universal planting drill of the current disclosure.
Figure 7:
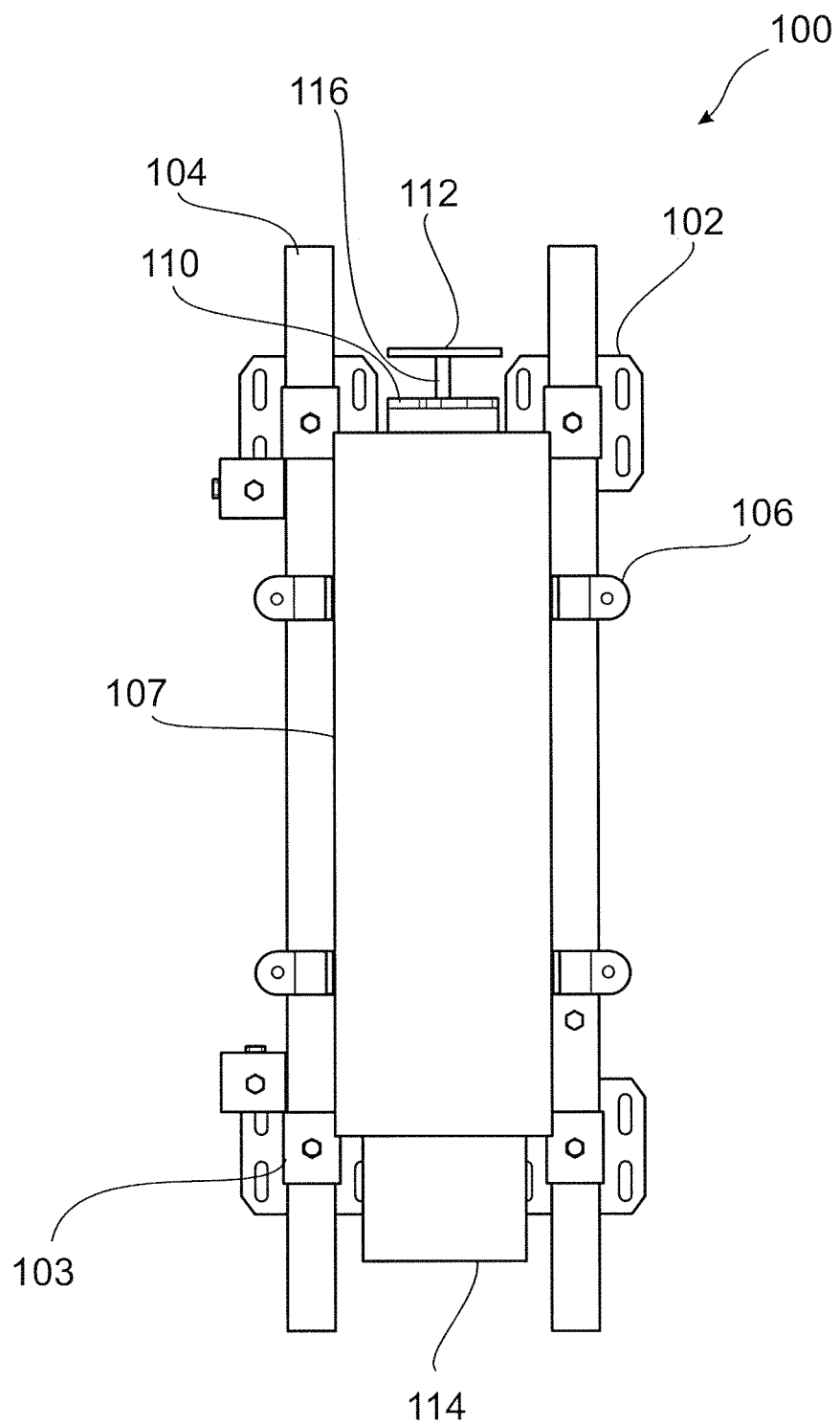
FIG. 7 shows a top down view of one embodiment of a universal planting drill of the current disclosure.
Figure 8:
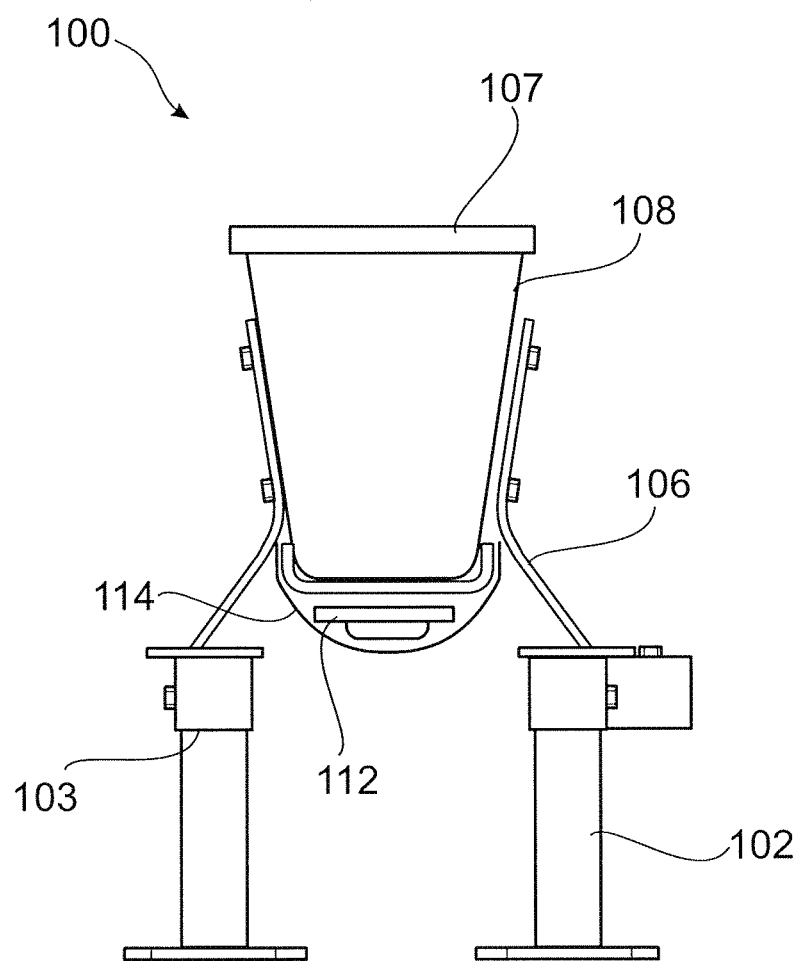
FIG. 8 shows an end-on view of one embodiment of a universal planting drill of the current disclosure.
Figure 9:
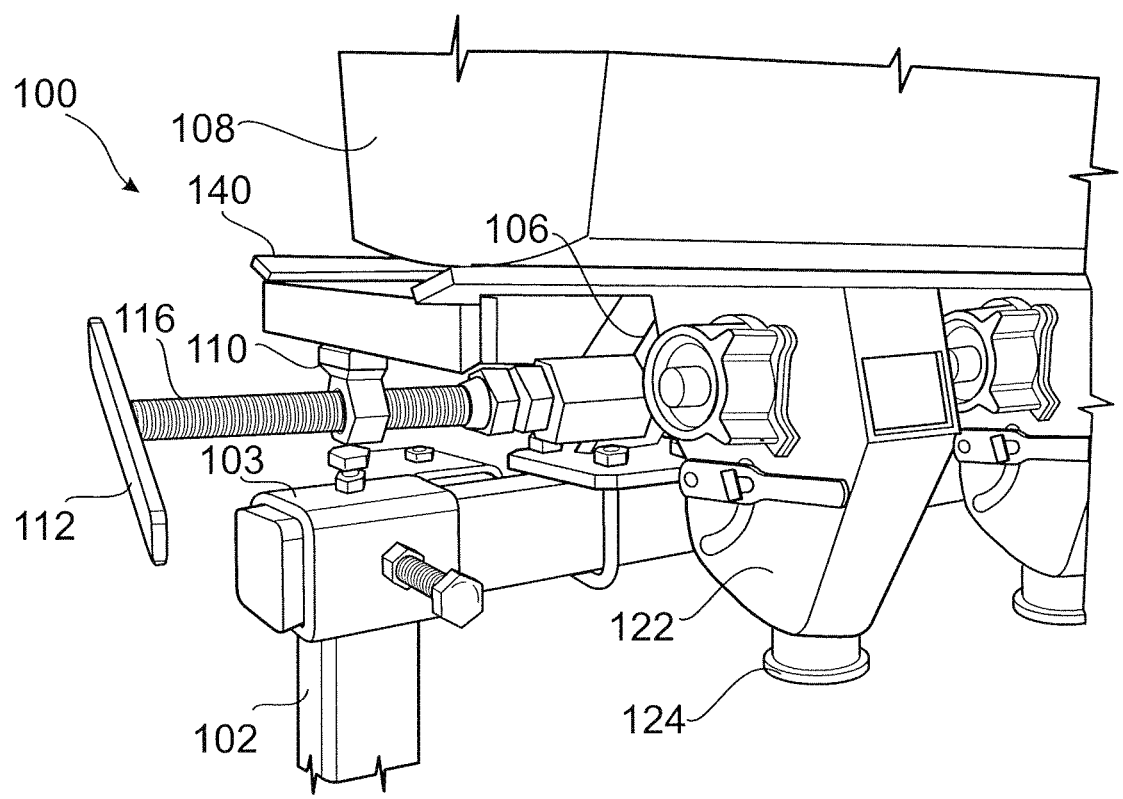
FIG. 9 is a close-up photograph of one embodiment of universal planting drill 100.

FIG. 4 shows a top down perspective view of one embodiment of universal planting drill 100. In this embodiment, drill mounting bracket 102 and horizontal mounting bar receiver 103 are formed integrally by addition of brace 130. FIG. 5 shows a side view of one embodiment of universal planting drill 100. FIG. 6 shows a bottom up perspective view of one embodiment of universal planting drill 100. FIG. 7 shows a stop down view of one embodiment of universal planting drill 100. FIG. 8 shows an end-on view of one embodiment of universal planting drill 100. FIG. 9 is a close-up photograph of one embodiment of universal planting drill 100 wherein support chassis 140 is used to provide additional support underneath seed box 108. Support chassis 140 may run at least substantially the length of seed box 108 and may be formed as an open rectangular frame in order to support bottom 118 of seed box 108. Support chassis 140 may also join with adjusting knob support 110 and serve to provide support to drive shaft 116 as well as seed dispensing cups 122. Support chassis 140 may be a 3/4" wide and 5/16" thick metal flat bar that will act as a washer (holes may be drilled and the attaching 1/4" bolt may pass thru both the plastic seed cup, the metal support chassis, and the aluminum seed box at each seed cup. The support chassis will also support the motor, the motor will be fastened to a metal plate that has drilled holes large enough to allow the support rails to pass thru, thus allowing the motor and plate to travel while still attached to the drive shaft. In addition the chassis may serve as support for the seed adjusting apparatus. The plate that holds the female nut part of the screw adjustment system may be held in place by again having holes large enough to slide over the rail for weight support or by welding or more probable bolting the plate to the support chassis.

Figure 10:
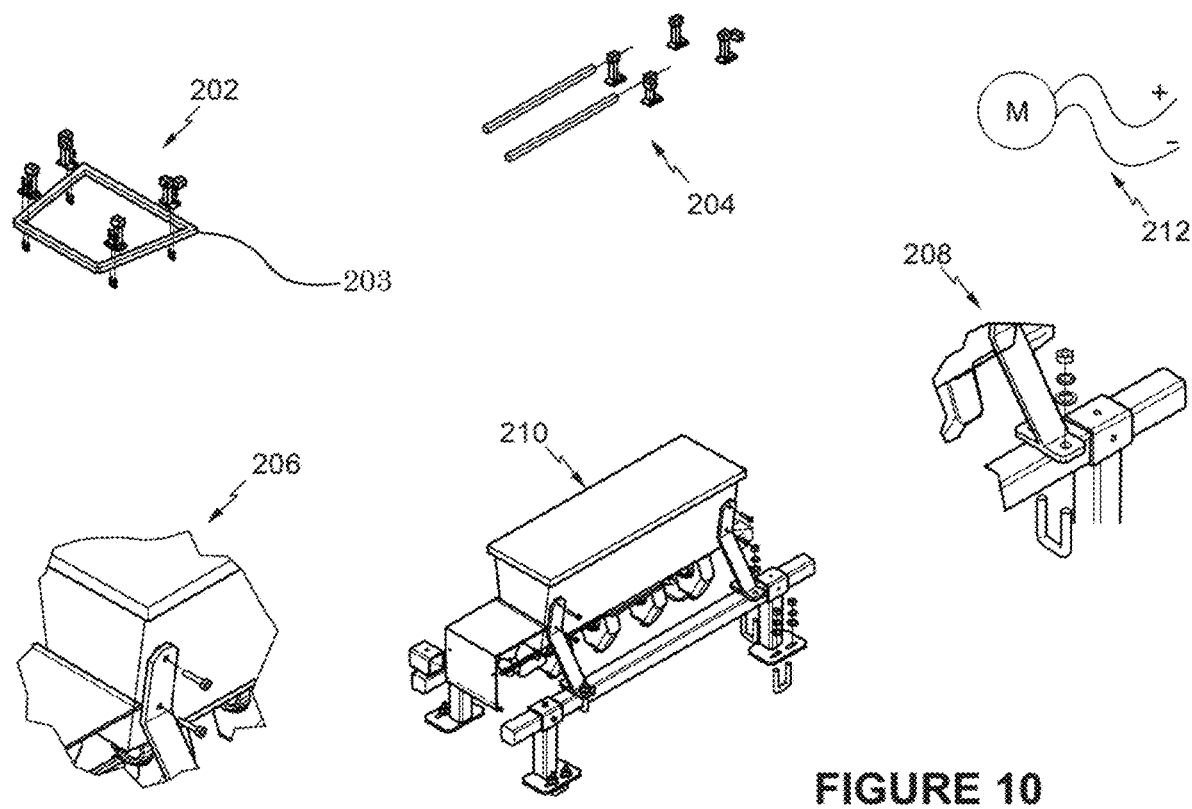
FIG. 10 shows a method of affixing a universal planting drill of the present disclosure.

The universal planting or grain drill of the present disclosure may be used with a multitude of host implements and may be easily removed and installed on as-needed basis. In a further embodiment, see FIG. 10, a method 200 is provided provide assembling a universal planting drill of the current disclosure. At step 202, implement brackets 201 may be mounted to host implement frame 203 of the existing farm implement via u-bolts 205. At step 204, horizontal mounting bars 207 may be inserted through implement brackets 201, the securing bolts may be left loose during this process to aid in assembly. If the implement to which the planting drill will be attached is comprised of angle iron, mounting blocks, not shown, may be used under implement brackets 201 for added support. At step 206, a seed box 209 is affixed via seed box mounting brackets 211, which may total four (4) or any other number appropriate to secure seed box 209 and the current disclosure should not be considered limited to just four (4) seed box mounting brackets 211, using bolts 213 inserted into seed box mounting brackets 211 and the seed box 209, any associated nuts used with bolts 213 may be left loose to aid in assembly. At step 208, the assembled seed box 209 and seed mounting brackets 211 are placed onto horizontal mounting bars 207 via secondary u-bolts 215. If seed box 209 includes a hinged opening, the hinged side of seed box 209 should be mounted facing toward the tractor or ATV, not shown, which will be engaged with the universal planting drill. At step 210, all nuts, bolts 213, and u-bolts 205 and 215 may be tightened. At step 212, wiring harness 217 may be connected to the tractor/ATV 12V connection or an external power supply, not shown.

Figure 11:
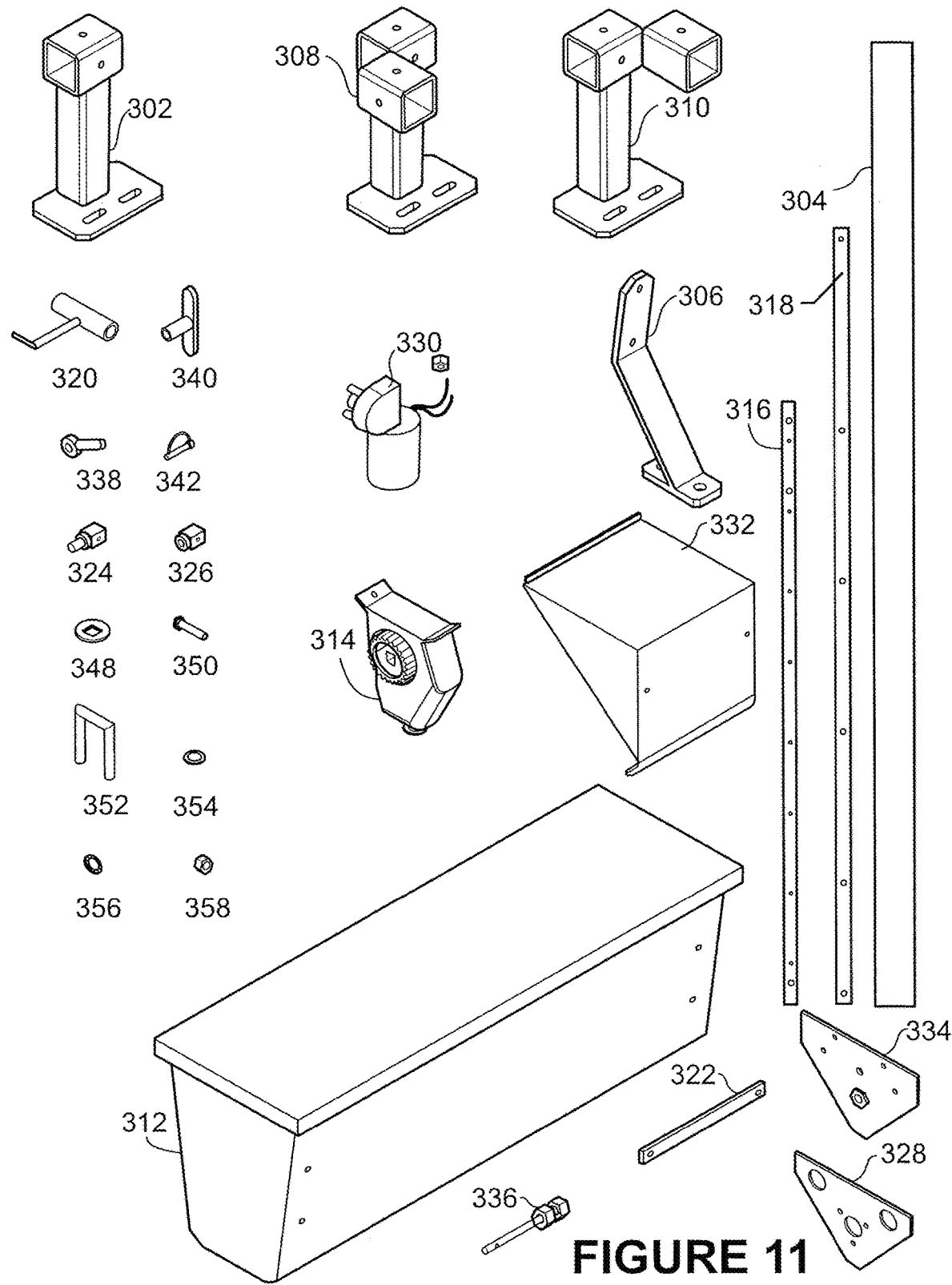
FIG. 11 shows one embodiment of a parts list of a universal planting drill of the current disclosure.

FIG. 11 shows one embodiment of a parts list for a universal planting drill of the current disclosure. This includes implement mounting brackets 302, horizontal mounting bars 304, seed box mounting brackets 306, universal implement mounting bracket L 308, universal implement mounting bracket R 310, seed box 312, seed dispenser 314, drive shaft 316, seed box support rail 318, seed flow indicator 320, seed flow indicator support 322, adjuster shaft coupling 324, motor shaft coupling 326, motor mounting plate 328, motor 330, motor cover 332, adjuster mounting plate 334, adjusting screw 336, adjuster lock 338, seed adjuster handle 340, pin for adjuster handle 342, cotter pin 344, spring pin 346, square washer 348, hex bolts 350, u-bolts 352, washers 354, lock washers 356, and nuts 358. In this embodiment, universal implement mounting bracket R and L are shown having at least two receivers 309 positioned at angles to one another. As discussed supra, receivers 309 may be positioned at angles to one another ranging from 0 to 180 and more than two receivers 309 may be affixed to brackets 308 and 310. This allows for accommodating different sized equipment when attaching the planting drill. The user may change the configuration of the mounting brackets and the mounting bar via selection of receivers 309 for insertion of the horizontal mounting bar in order to accommodate a wide variety of shapes and styles of farming equipment to which the planting drill is attached.

FIG. 12 shows a settings chart for a universal planting drill of the present disclosure.

In one embodiment, once the universal planting drill of the current disclosure is secured to the host implement wiring for the 12 volt motor must be connected. A cord is supplied and must be connected to a 12V connection (directly to the battery terminals or other locations that provides 12V) from the tractor/ATV. An inline on/off switch is included within the battery cord and the user will be able to engage the motor by switching the device to the "on" or disengage by switching to the "off" position. Once the switch is moved to the "on" position the 12V motor will rotate the drive shaft in which the seed gears are attached. The rotation of the seed gears located in the seed cups will pull seed from the seed box while simultaneously pushing the seed thru the seed cup. Once the seed is pushed thru, gravity will cause the seed to drop into a seed tube (an option that will create a defined row) or onto the ground or deflector plate (creating a more "spread out" appearance) depending on the users desire. As the motor is engaged and seed is being dispensed from the Wendell Drill the travel speed of the vehicle pulling the host implement will further dictate the consistency of the seed per acre. The host implement can both open and close the soil as the seed is being dropped to ensure planting.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A universal planting drill comprising:
   at least one implement mounting bracket, wherein the at least one implement mounting bracket is removably affixed to a host implement frame, wherein the at least one implement mounting bracket has at least two openings positioned at an angle to one another, the openings located opposite a portion of the at least one implement mounting bracket that engages with the host implement frame;
   at least one horizontal mounting bar;
   wherein the at least two openings are configured to engage the at least one horizontal mounting bar and the at least one horizontal mounting bar passes through one of the at least two openings; and
   a seed box affixed to the at least one horizontal mounting bar via at least one seed box mounting bracket.

2. The universal planting drill of claim 1 further comprising a wiring harness.

3. The universal planting drill of claim 1, wherein the at least one implement bracket is configured to slidably engage the host implement frame.

4. The universal planting drill of claim 1 wherein the at least one implement mounting bracket is configured to slidably engage the at least on horizontal mounting bar and can be variably positioned along a length of the at least one horizontal mounting bar.

5. The universal planting drill of claim 1, wherein the universal planting drill is not ground driven.

6. The universal planting drill of claim 1, wherein the seed box comprises a seed dispenser and a drive shaft.

7. The universal planting drill of claim 1, further comprising a seed direction motivator.

8. The universal planting drill of claim 1, further comprising a motor.

9. A method of adding a universal planting drill to an existing host implement frame comprising:
   forming at least one implement mounting bracket having at least two openings positioned at an angle to one another and a portion for engaging a host implement frame formed opposite the at least two openings on the at least one mounting bracket;
   removably attaching the at least one implement mounting bracket to the host implement frame;
   affixing at least one horizontal mounting bar to the at least one implement mounting bracket wherein the at least two openings are configured to engage the at least one horizontal mounting bar and the at least one horizontal mounting bar passes through one of the at least two openings; and
   attaching a seed box to the at least one horizontal mounting bar via at least one seed box mounting bracket, wherein the universal planting drill is thereby affixed to an existing implement.

10. The method of claim 9, further comprising connecting the universal planting drill to a power source.

11. The method of claim 9, further comprising configuring the at least one implement bracket to slidably engage a host implement frame.

12. The method of claim 9, further comprising configuring the at least one implement mounting bracket to slidably engage the at least on horizontal mounting bar such that it can engage at various positions along a length of the at least one horizontal mounting bar.

13. The method of claim 9, further comprising configuring the universal planting drill such that the universal planting drill is not driven or caused to deploy seeds via contact with the ground.

14. The method of claim 9, further comprising configuring the seed box to include a seed dispenser and a drive shaft.

15. The method of claim 9, further comprising attaching a seed direction motivator to the universal planting drill.

16. The method of claim 9, further comprising attaching a motor to the universal planting drill.

* * * * *